(12) United States Patent
Schipani et al.

(10) Patent No.: US 6,672,792 B1
(45) Date of Patent: Jan. 6, 2004

(54) TUBE FASTENER APPARATUS

(75) Inventors: Ralph L. Schipani, Edina, MN (US); Richard K. Strayer, Andover, MN (US); Michael B. Lasky, Edina, MN (US); Lee T. Egbert, Minneapolis, MN (US)

(73) Assignee: Interlock Structures Internatioal Inc., Minneapolis, MN (US)

( * ) Notice: Subject to any disclaimer, the term of this patent is extended or adjusted under 35 U.S.C. 154(b) by 28 days.

(21) Appl. No.: 10/184,682

(22) Filed: Jun. 28, 2002

(51) Int. Cl.[7] .............................................. F16B 21/00
(52) U.S. Cl. ..................... 403/322.4; 403/27; 403/49; 403/292; 52/726.2; 52/584.1; 52/585.1; 285/320
(58) Field of Search ............................ 403/322.4, 322.1, 403/27, 49, 300–305, 306, 292; 285/320, 93; 52/726.1, 726.2, 584.1, 585.1; 248/410, 159

(56) References Cited

U.S. PATENT DOCUMENTS

| | | | |
|---|---|---|---|
| 2,643,138 A | * | 6/1953 | Jacobs et al. .................. 285/5 |
| 3,000,656 A | * | 9/1961 | Hollaender ................. 403/298 |
| 3,494,641 A | * | 2/1970 | Caregnato .................... 285/311 |
| 4,068,870 A | * | 1/1978 | Whitney et al. ............. 285/320 |
| 4,194,849 A | * | 3/1980 | Matsuura ..................... 403/49 |
| 5,005,876 A | * | 4/1991 | Fahl ............................ 285/311 |
| 5,628,531 A | * | 5/1997 | Rosenberg et al. ........... 285/81 |
| 5,701,713 A | | 12/1997 | Silver |
| 5,900,850 A | | 5/1999 | Bailey et al. |
| 6,026,626 A | | 2/2000 | Fisher |
| 6,076,770 A | | 6/2000 | Nygren et al. |
| 6,219,009 B1 | | 4/2001 | Shipley et al. |
| 6,219,974 B1 | | 4/2001 | Hoberman |
| 6,233,881 B1 | | 5/2001 | Rainbolt |
| 6,240,940 B1 | | 6/2001 | Carter |
| 6,244,010 B1 | | 6/2001 | Sluiter |
| 6,253,520 B1 | | 7/2001 | Houk |
| 6,260,327 B1 | | 7/2001 | Pellock |
| 6,266,030 B1 | | 7/2001 | Warren et al. |
| 6,276,095 B1 | | 8/2001 | Tripsianes |
| 6,276,521 B1 | | 8/2001 | Arndt et al. |
| 6,283,136 B1 | | 9/2001 | Chen |
| 6,293,500 B1 | | 9/2001 | Bigelow |
| 6,296,077 B1 | | 10/2001 | Wood et al. |
| 6,296,109 B1 | | 10/2001 | Nohl |

* cited by examiner

Primary Examiner—Lynne H. Browne
Assistant Examiner—Jori Schiffman
(74) Attorney, Agent, or Firm—Altera Law Group LLC

(57) ABSTRACT

A fastener connects an insert to a hollow tube. The fastener is formed to have a yoke portion extending between a pair of arm portions, all of which are formed arcuately to conform to the shape of tube. Arm portions have arcuate free ends with horizontally oriented seams. Arm portions include protuberances which then may be cammed between an engagement position with edges of openings in the tube and edges of a cavity space in insert and a disengageable position between the edges. The fastener includes a lifting handle that is spaced away from the tubes surface to form an access gap.

26 Claims, 4 Drawing Sheets

Section 1-1

TUBE FASTENER APPARATUS

FIELD OF THE INVENTION

The present invention is directed generally to fasteners and, more particularly, to apparatus for connecting hollow tubes end-to-end with an insert.

BACKGROUND OF THE INVENTION

The present invention is directed to the problem of bringing tubes together along a longitudinal or axial direction and connecting them together. In this regard, there are fastening devices which function after first moving the tubes in a transverse direction relative to one another. Many applications, however, do not allow for such movement. Even if they do, the connecting or fastening devices usually include end members having a larger transverse dimension than the transverse dimension of the tubes. Such bulky devices may not be desirable for either functional or aesthetic reasons.

Oftentimes, when tubes are moved longitudinally or axially, one is swaged to allow it to telescope into the other. Such interacting ends hold the tubes together in one axial direction, but not the other. A common positive attachment is obtained by then using a bolt and nut. Such attachment is simple, but the lines of the tubes are aesthetically broken. Further, a bolt and nut usually requires tools and are prone to complications during installation such as cross-threading.

What is needed is a fastener that disengageably engages tubes together which are longitudinally or axially moved into engagement with one another and which fastener does not extend significantly from the profile of the tubes. Further, the fastener should be easily installable and removable without tools.

SUMMARY OF THE INVENTION

In a basic form, the present invention is directed to a fastener for connecting a hollow tube and an insert member.

In one embodiment, a connecting assembly is described for connecting a hollow cylindrical tube. The tube includes a tube wall, having a pair of aligned openings. The connecting assembly includes an insert member with an outer surface formed to slide into the tube. The outer surface of the insert member has a cavity space alignable with the openings of the tube.

The connecting assembly also includes a rotating fastener with a pair of plate-like arm portions each having an end with a curved edge. Each of the arm portions is formed with a profile shaped to curve around some portion of the tube. Each of the arm portions includes a protuberance fitting into one of the openings of the tube and into the cavity space of the insert member to fasten the tube and insert member together. The rotating fastener further includes a handle member connected between the arm portions. The handle member is generally arcuate in shape and protrudes above an outer surface of the tube to form an access gap between the tube and the handle member. The handle member allows rotation of the arm portions between an engagement and a disengagement position. The engagement position is defined where the profile of the arm substantially conforms to the outer surface of the tube. The disengagement position is defined where a portion of the curved edge of the arm portions ride against the outer surface of the tube and moves the protuberances outward from the cavity space thereby substantially releasing the insert member.

The access gap may include a gap dimension defined as the radial distance between the handle member and the outer surface of the tube when the rotating fastener is in the engagement position. The gap dimension measures from 3 to 6 percent of an outer diameter of the tube, and in some cases typically about the thickness of an average human fingernail.

Each of the arm portions of the rotating fastener may further include a first and second seam located at a first and second edge of the partially circular perimeter of the arm portions. The seams are oriented generally parallel to a longitudinal axis of the tube when the rotating fastener is in the engagement position to provide an unbroken engagement surface between the tube and the arm portions.

The connecting assembly may further include a safety marking on the connector. The rotating fastener is adapted to obscure the safety marking in the engagement position. The safety marking is visible in the disengagement position. The safety marking can include a reflective element and/or a laser identifiable reflector. The safety marking can be located on the tube so that the safety marking is obscured by the handle member and/or one or more arm portions when the rotating fastener is in the engagement position.

In one configuration, the handle member of the rotating fastener further includes a leading edge generally perpendicular to a longitudinal centerline of the tube, the leading edge sloping towards the tube in the engagement position, a radial distance between the leading edge and the outer surface of the tube defining the access gap.

In another embodiment of the present invention, a connecting apparatus includes first and second longitudinally-extending, hollow tubes. The tubes have first walls and first open ends, and each of the first walls has a pair of openings. The connecting apparatus further includes a pair of fastener members. Each fastener member includes protuberances fitting in one of the pairs of openings in one of the first walls in an engagement position of the fastener members. The fastener members are rotatable about the protuberances. A pair of plate-like arm portions straddles the pair of openings and are connected to the protuberances. A lifting means is connected between the arm portions. The lifting means protrudes above an outer surface of the tubes to form an access gap. A disengagement means moves the protuberances outward from the openings when the fastener members are rotated about the protuberances to a disengagement position of the fastener members.

The connecting apparatus further includes an insert member having a second wall formed to slide longitudinally into the first open ends of the tubes. The insert member includes means for moving the pair of connected protuberances of each of the fastener members and means for receiving the protuberances so that the protuberances can engage the tubes and the insert member.

The moving means of the insert member may include a tapered end on the insert member. The insert member may also include first and second parts, and holding means for holding the first and second parts together. The holding means includes means for supporting an accessory extending transversely from the insert member. In one configuration, the holding means includes threaded openings in facing ends of the first and second parts and a threaded rod received in each of the openings. In another configuration, the accessory is a plate having openings for receiving the threaded rods in regions between the first and second parts.

The connecting apparatus may further include a safety marking, the safety marking obscured by the fastener members in the engagement position. The safety markings may include a reflective element and/or a laser identifiable reflector. The safety marking can be located on at least one of the tubes so that the safety marking is obscured by one or more arm portions and/or the lifting means of the fastener members in the engagement position.

The lifting means of the fastener members may include a leading edge generally perpendicular to a longitudinal centerline of the tube, the leading edge sloping towards the tube when the protuberances engage the tubes and the insert member, a radial distance between the leading edge and the outer surface of the tube defining the access gap.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

Figure 1:
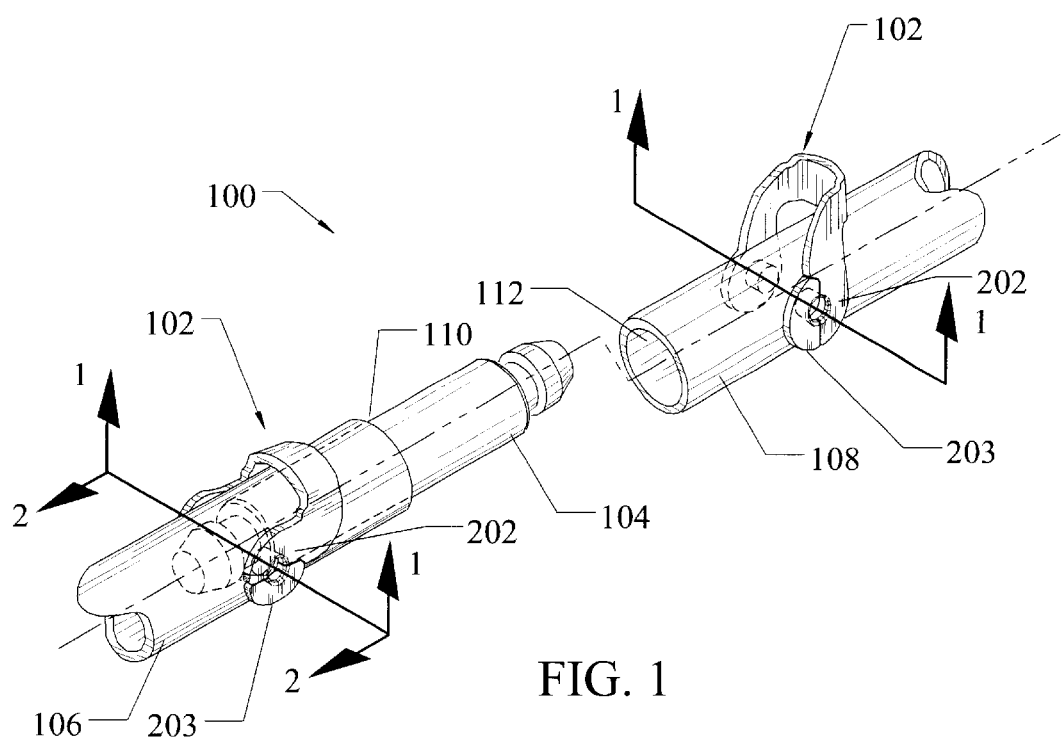
FIG. 1 is a perspective view of a first tube fastened to an insert in accordance with the present invention and of a second tube ready to be fastened to the insert.

While the invention is amenable to various modifications and alternative forms, specifics thereof have been shown by way of example in the drawings and will be described in detail herein. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF THE VARIOUS EMBODIMENTS

Referring now to the drawings wherein like reference numerals designate identical or corresponding parts throughout the several views and wherein identical or corresponding parts on alternate embodiments are identified by the same reference numerals, and referring more particularly to FIG. 1, a connecting assembly in accordance with the present invention is designated generally by the numeral 100. The connecting assembly 100 includes a fastener 102 which releasably fastens one end of an insert 104 to a tube 106.

The assembly 100 is typically used to connect the tube 106 to a second tube 108. The second tube 108 includes a fastener 102 that engages another end of the insert 104. The fasteners 102 are rotatable about an axis to engage and disengage the insert 104 from the tube 106. As shown in FIG. 1, the fastener 102 on tube 106 is in the engagement position, and fastener 102 on tube 108 is in the disengagement position. As will become apparent, rotating the fastener 102 for engagement/disengagement of the connecting assembly 100 can be beneficially accomplished without the use of tools.

The tubes 106, 108 are longitudinal members which may have a variety of cross-sectional shapes, such as square, cylindrical, etc. It is also not necessary that the tubes 106, 108 be completely enclosed. In this embodiment, however, tubes 106, 108 are cylindrical and are hollow at least at open ends 110 and 112. A pair of openings 204 (see FIG. 2) are spaced a short distance from open ends 110, 112. Openings 204 are preferably centered on a line passing through the longitudinal axis of tubes 106, 112.

Figure 2:
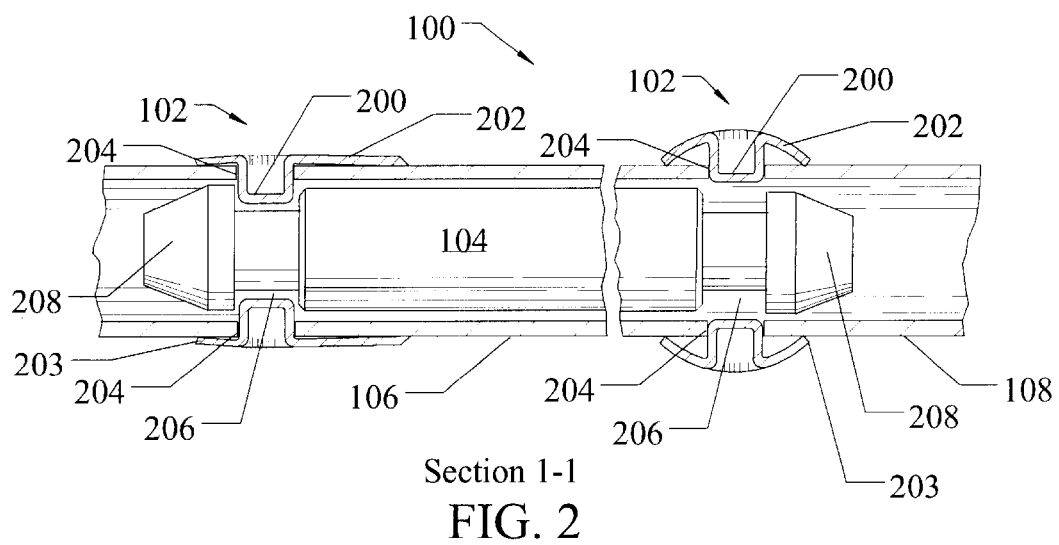
FIG. 2 is a cross-sectional view taken along line 1—1 of FIG. 2.

Features of the fasteners 102 that allow engagement and disengagement of the connecting assembly 100 are illustrated in the cross sectional view of FIG. 2. The fastener 102 includes a pair of protuberances 200 that are connected to arm portions 202, the arm portions 202 straddling either side of the tubes 106, 108. Each arm portion 202 has a curved (e.g. circular) edge 203, the curved edges 203 centered about the protuberances. The protuberances 200 fit within the pair of openings 204 in the tube walls. In the engagement position (the left side of FIG. 2), the protuberances 200 are locatable within a cavity space 206 in the insert 104. The interference of the protuberances 200 with the openings 204 and cavity space 206 prevent the insert from moving past the protuberances 200.

The disengagement position of the fastener 102 is shown in the right side of FIG. 2. The arm portions 202 have an arcuate shape that conforms to the shape of the tube outer surface when the connector is in the engagement position. When moved to the disengagement position, the arcuate arm portions 102 are oriented against the tube 106, 108 such that the curvature of the arm portion 202 is rotated approximately 90 degrees relative to the curvature of the tube's outer surface. In the disengagement position, a portion of the curved edge of the arm portions 202 rides against the outer surface of the tube 108. Rotating the arm portions 202 to the disengagement position from the engagement position causes the arm portions 202 to "cam" away from the tube walls, thereby withdrawing the protuberances 200 out of the cavity spaces 206.

The insert 104 advantageously includes tapered ends 208 that allow the insert to be inserted in a tube 106, 108 without moving the fastener 102 to the disengagement position. It may be desirable that the protuberances 200 extend into the interior of the tube 106, 108 even when the fastener 102 is in the disengagement position, as it can prevent inserting the insert 104 too far into the tube 106, 108. The tapered ends 208 of the insert 104 preferably have a diameter smaller than the diameter of the center portion of the insert 104. The larger diameter of the center portion cannot pass the protuberances 200, thereby preventing the insert 104 from being pushed too far into the tube. The amount of protrusion of protuberances 200 into the tube in the disengagement position can be adjusted such the smaller diameter of the tapered ends 208 can be easily be pulled past the protuberances 200, while the center of the insert 104 is prevented from being accidentally pushed into the center of the tube 106,108.

Figure 3:
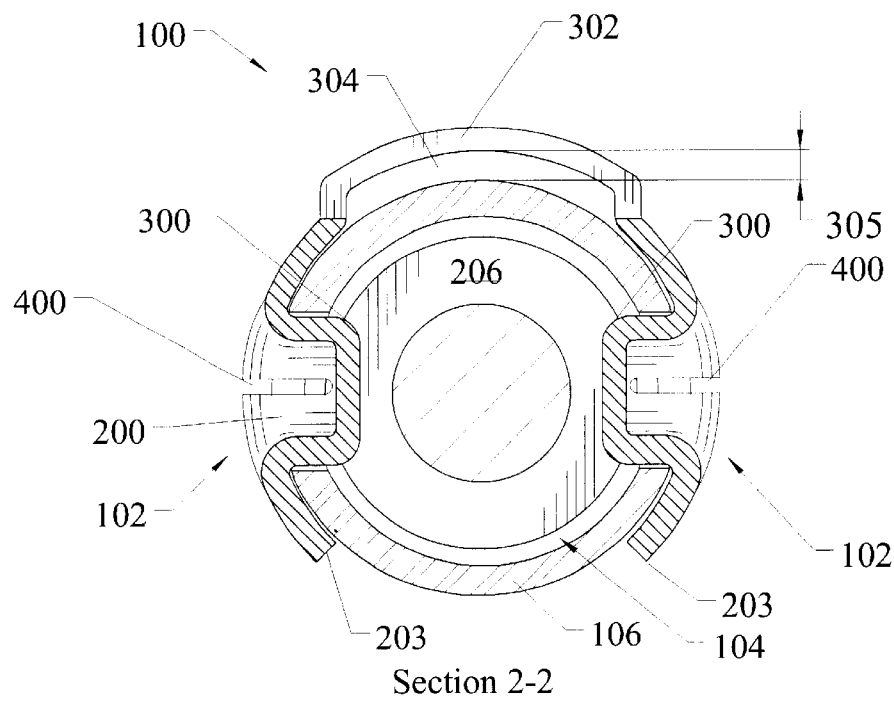
FIG. 3 is a cross-sectional view taken generally along lines 2—2 of FIG. 1, with the insert shown to be inserted in the tube.

Further details of the fastener 102 can be seen in FIG. 3. The protuberances 200 may be formed as cup-shaped indentations with rounded edges 300. The rounded edges 300 allow easier insertion of the insert 104 when the fasteners 102 are in the engagement position. The arm portions 202 are shaped to conform with the outer curvature of the tube 106. It is appreciated that the arcuate shape of the arm portions 202 serves to cam the arm portions 202 outward from the tube 106 when the fastener 102 is rotated to the disengagement position. As previously described, arm portions 202 preferably include an curved edge 203 with more than 180 degrees of an arc, the curved edge 203 centered about the protuberances 200.

A handle member 302 connects to the arm portions 202 and facilitates rotating the fastener 102 between engaged and disengagement positions. A gap 304 is preferably included between the handle member 302 and the tube 106. The gap 304 has a gap distance 305 defined as the radial distance between the handle member 302 and the tube's outer surface. One benefit provided by the gap 304 is in allowing the handle member 302 to be more easily lifted from the engagement position, creating, in effect, a thumbnail lift point. Without the gap 304 (i.e. the handle member 302 is flush against the tube), it is more difficult to grasp and edge of the handle member 302 using hands or fingernails. The gap 304 should not be spaced so large, however, that it can be engaged by other objects which might snag and inadvertently lift it.

When the fastener 102 is in the engagement position, a gap 304 having a gap distance 305 between 3% and 6% of the tube's outer diameter is sufficient in most cases, the gap generally not exceeding 0.25 inches (6.4 mm) in size. Preferably, the gap distance is 4% of the tube's outer diameter. So, for example, for a tube 106 with outer diameter if 0.625 inches (15.9 mm), the gap is between 0.0188 and 0.0375 inches (0.478 and 0.953 mm), and preferably 0.0250 inches (0.635 mm). It is appreciated that the gap size should scale with the outer tube diameter, because the larger the tube 106, the larger the fastener 102 and therefore more force is likely needed to initiate rotating the fastener 102. For smaller tubes (tube diameter less than ¾ inch, for example) it is appreciated that making the gap distance 305 generally about the thickness of an average human fingernail or thumbnail will provide sufficient lifting access to initiate rotation of the fastener 102.

The shape of the handle member 302 is preferably smooth along the outside surface to lessen the likelihood of snagging during use. As shown in FIG. 3, the handle member 302 is preferably arcuate and encompassing an arc angle between 60 and 100 degrees. A benefit of this arcuate shape of the handle member 302 is that it, along with other enhancements described herein, tends to provide greater strength to the fastener 102, thereby increasing the fastener's effectiveness.

Figure 4:
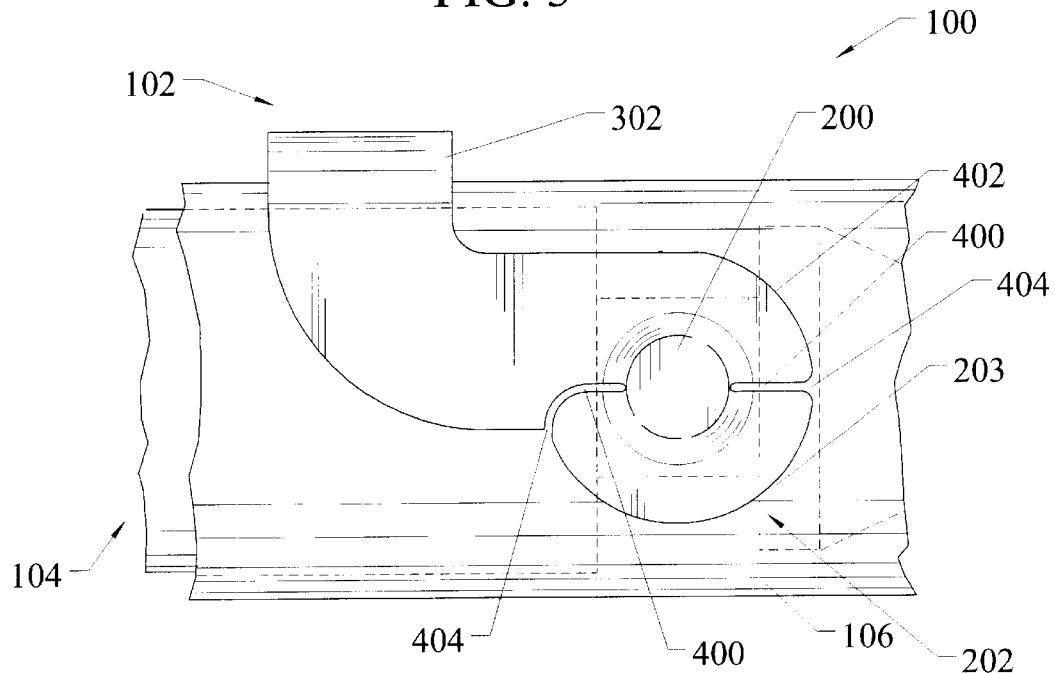
FIG. 4 is a side view of the engaged fastener of FIG. 1.

Turning now to FIG. 4, the side portions 202 include curved edges 203 and seams 400. The curved edges 203 are approximately centered on the protuberances 200 and facilitate a smooth camming action of the side portions 202 on the tube surface when the fastener 102 is rotated. The seams 400 are typically an artifact of manufacture when the fastener 102 is formed by bending or stamping. The seams 400 are preferably oriented generally parallel to a centerline of the tube 106 when the fastener 102 is in the engagement position.

This parallel-to-centerline seam orientation has a number of benefits. The intersections 404 between the seams 400 and the curved edges 203 of the side portion 202 contain transitions with small radii and may cause excessive wear on the tube if these intersections 404 contacts the tube during rotation of the fastener 102. The maximum force between the curved edge 203 and tube 106 typically occurs at the fully disengagement position of the fastener 102, i.e. rotated approximately 90 degrees clockwise from the position shown in FIG. 4. In the disengagement position, the edge-to-seam intersections 404 are oriented vertically and are not in contact with the tube 106 (best seen in the right side of FIG. 1). The only time the edge-to-seam intersections 404 can contact the tube 106 is in the engagement position, when forces between the side portions 202 and tube 106 are minimal.

The seams 400 also tend to locally weaken the side portions 202 at the edge-to-seam intersection 404. Therefore, it is advantageous to have the seams 400 located as far as possible from the contact between the curved edge 203 and tube surface when forces are maximum, e.g. when the fastener 102 is in the disengagement position. The parallel-to-centerline orientation of the seams 400 as shown in FIG. 4 accomplishes this, and thereby provides positive and reliable disengagement of the side portion protuberances 200 when the fastener 102 is rotated into the appropriate position. Because of the more effective disengagement of the protuberances 200, the connecting assembly 100 is made much easier to disassemble.

Although the components of the connecting assembly 100 can be formed from any appropriate material, the components are typically formed from steel. For desirable wear and stiffness characteristics, the fastener 102 can be formed from a spring steel such as 0.022 inch thick C1050 annealed. The insert 104 is typically formed from a solid rod of cold rolled steel. The tubes 106,108 are preferably formed from a material not significantly softer than the fastener 102 to reduce wear on the tubes 106,108 caused by repeated engagement and disengagement of the fastener 102.

Numerous embodiments of the fastener 102 in accordance with the present invention are possible. The various embodiments include forming the fastener 102 by extruding the protuberance, drawing the protuberance, forming the protuberance with a rivet, and making the fastener 102 from plastic. Features which are common to various embodiments include the handle member 302 with a gap 304, as well as the arm portions 202 having curved edges 203 and a profile conforming to the tubes 106,108. The aforementioned shape features of the arm portions 202 provide moving fulcrums along camming surfaces that act to withdraw the protuberances from engagement with a cavity space in the insert 104 when the fastener 102 is moved from an engagement position to a disengagement position.

Figure 4A:
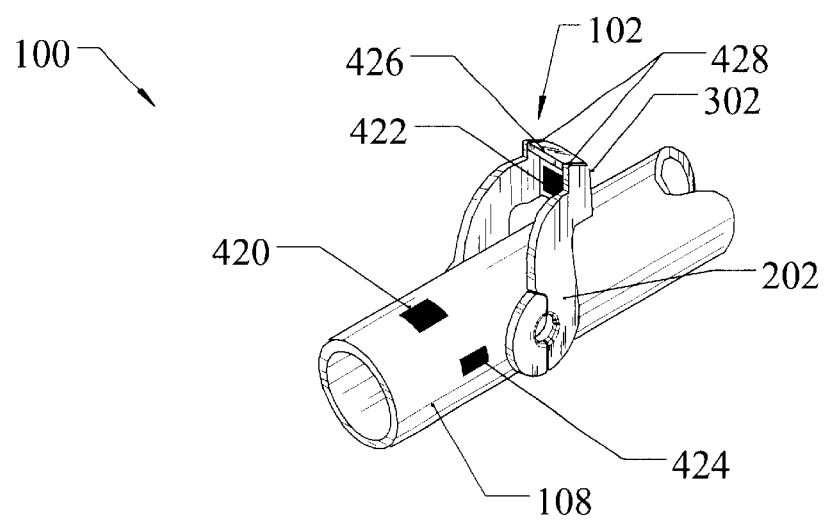
FIG. 4A is a perspective view of a fastener incorporating safety features according to the present invention.
Figure 4B:
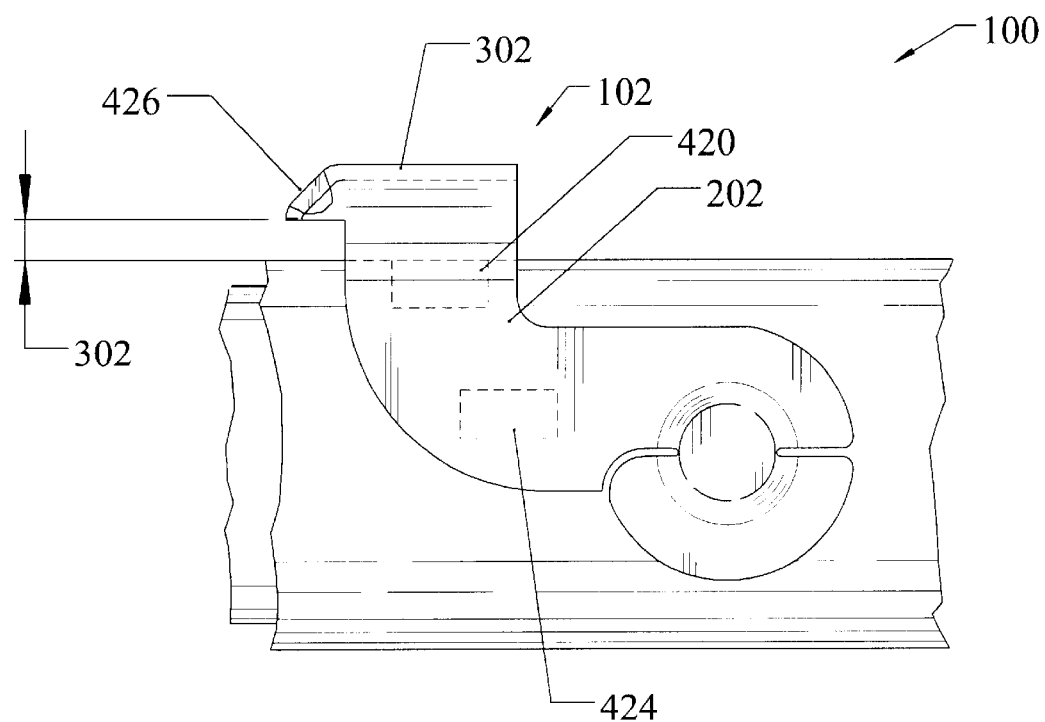
FIG. 4B is a side view of a fastener incorporating safety features according to the present invention.

Further configurations of the present invention include safety enhancements of the connecting assembly 100 as shown in FIGS. 4A–B. In FIG. 4A, safety markings 420 and 424 are applied to the outer surface of the tube 108. A safety marking 422 can also be applied to the fastener 102, preferably located at an inner surface of the handle member 302. The locations of the safety markings 420, 422, 424 are such that the markings are visible when the fastener 102 is in the disengagement position, but are obscured (see FIG. 4B) when the fastener 102 is in the engagement position. The safety markings 420, 422, 424 provide visual confirmation that the fastener 102 is engaged, thereby providing a visual cue of unsafe conditions and making inspections easier. It is appreciated that any of the marking locations shown can be used separately or in combination. Applying safety markings 420, 422, 424 at all the indicated locations ensures that unsafe conditions can be detected from various view angles.

The safety markings 420, 422, 424 can be applied in any number of ways, typically as paint or adhesive strips. Laser reflective tagging can also be employed so that a laser scan of a large or complex lattice structure could provide and electronic warning if any connectors are improperly left in an unlatched position. Any recognized tag reflection would indicate an installation error. The generally accepted color for safety markings 420, 422, 424 is red, thereby indicating an unsafe condition. The safety markings 420, 422, 424 may also include reflective elements, such as found in reflective tape. By using reflective markings, unsafe conditions can be more easily determined by using a flashlight in installations where the connecting assembly 100 is substantially covered or in a dark area.

To prevent accidental disengagement of the fastener 102 due to snags or incidental contact with other objects, the embodiment illustrated in FIGS. 4A–B includes a sloping edge 426 located on the handle member 320. The sloping edge 426 is located on an edge of the handle member furthest from the rotation axis of the fastener 102. The sloping edge 426 can be formed with seams 428 between the sloping edge 426 and the side portions 202. The seams 428 can either be left unconnected for ease of manufacture, or joined (e.g. welded) to provide a more smooth contour. Joining the seams 428 also stiffens the fastener 102, thereby providing a greater bending force pushing the side arms 202 and protuberances 200 towards the center of the tube 108. As seen in FIG. 4B, the sloping edge 426 can be configured such that an access gap 302 is provided in the engagement position.

A collision with another object at the sloping edge 426 will create a force having a radial vector component towards the tube 108 that is greater than the vector component collinear with the longitudinal axis of the tube 108. Such a collision will tend to maintain the fastener 102 in a locked, closed state rather than inadvertently flipping it over. The sloping edge 426, therefore, prevents accidental disengagement of the fastener 102 due to snags or incidental contact.

Figure 5:
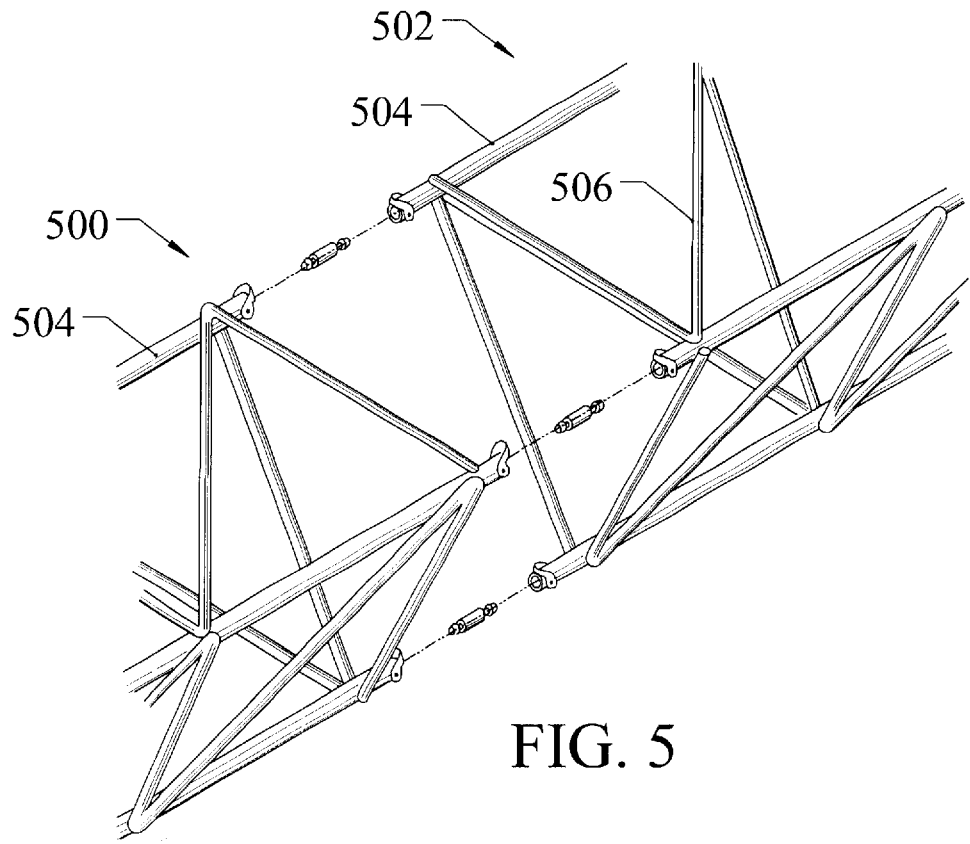
FIG. 5 is an exploded perspective view of a pair of triangular trusses which may be fastened together in accordance with the present invention.
Figure 6:
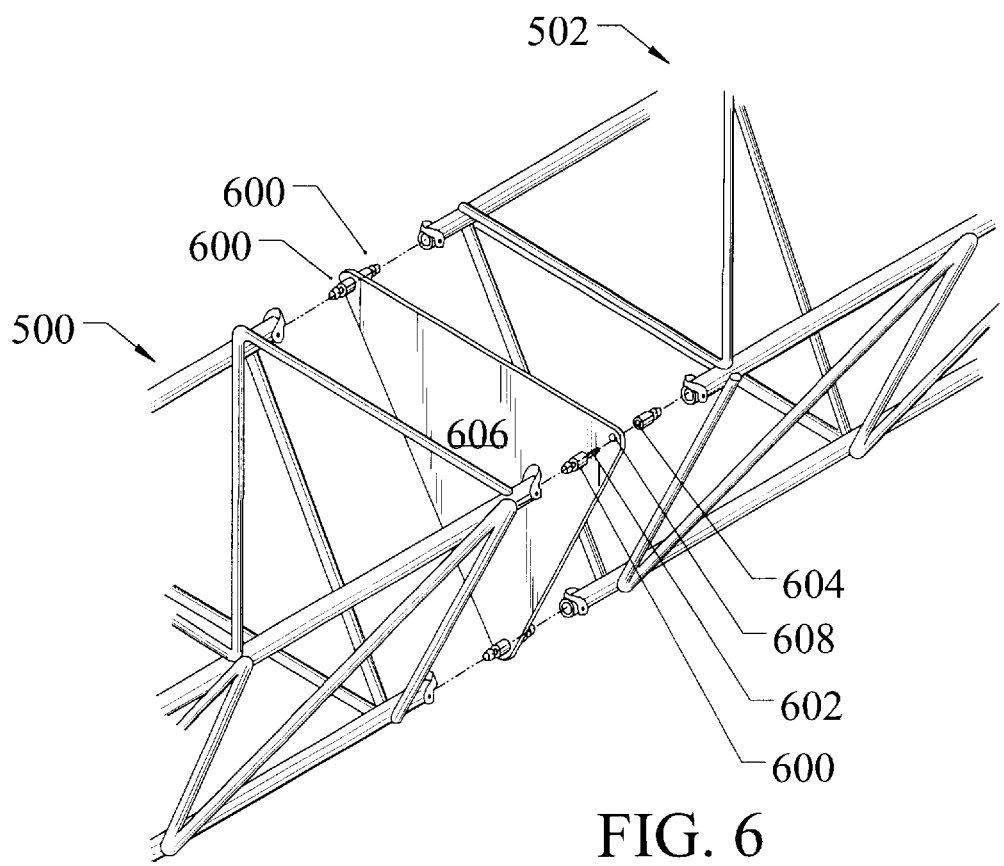
FIG. 6 is similar to FIG. 5 except the inserts are formed in two parts so as to receive a plate therebetween.

Further applications of the present invention are shown in FIGS. 5 and 6. In FIG. 5, first and second truss members 500 and 502 are shown with each tube 504 connected together in the fashion of FIG. 1. The various tubes 504 are interconnected by webbing 506. In this way, the tubes 504 are held spaced-apart and are held to extend longitudinally in an approximately parallel fashion.

In FIG. 6, truss members 500 and 502 are connected together using inserts 600 with a threaded rod 602 threaded into a threaded opening 604 at the facing ends of inserts 600. Plate 606 includes unthreaded openings 608 which can receive threaded rods 602 therethrough to thereby hold plate 606 between inserts 600 and, consequently, between trusses 500 and 502. It is understood that plate 606 may have any thickness and a variety of shapes.

Thus, the fastener of the present invention has been described in the form of a variety of embodiments. Nevertheless, it is understood that the disclosure is conceptual and that further equivalents are possible. Consequently, in the spirit of the present invention, any changes made, especially in matters of shape, size, and arrangement of parts to the full extent extended by the general meaning of the terms in which the appended claims are expressed, are within the principle of the invention.

What is claimed is:

1. A connecting assembly for connecting a hollow cylindrical tube having a tube wall, the tube wall having a pair of aligned openings, the connecting assembly comprising:

an insert member having an outer surface, the outer surface of the insert member being formed to slide into the tube, the outer surface of the insert member having a cavity space alignable with the openings of the tube; and a rotating fastener comprising a pair of plate-like arm portions each having an end with a curved edge, each of the arm portions being formed with a profile shaped to curve around some portion of the tube, each of the arm portions including a protuberance fitting into one of the openings of the tube and into the cavity space of the insert member to fasten the tube and insert member together, the rotating fastener further comprising a handle member connected between the arm portions, the handle member generally arcuate in shape and protruding above an outer surface of the tube to form an access gap between the tube and the handle member, the handle member allowing rotation of the arm portions between an engagement and a disengagement position, the engagement position defined where the profile of the arm substantially conforms to the outer surface of the tube, the disengagement position defined where a portion of the curved edge of the arm portions ride against the outer surface of the tube and moves the protuberances outward from the cavity space thereby substantially releasing the insert member.

2. The connecting assembly of claim 1, wherein the access gap has a gap dimension defined as the radial distance between the handle member and the outer surface of the tube when the rotating fastener is in the engagement position, the gap dimension measuring from 3 to 6 percent of an outer diameter of the tube.

3. The connecting assembly of claim 1, wherein the access gap has a gap dimension defined as the radial distance between the handle member and the outer surface of the tube when the rotating fastener is in the engagement position, the gap dimension is generally sufficient to allow lifting access to initiate rotation of the fastener.

4. The connecting assembly of claim 1, wherein each of the arm portions of the rotating fastener further comprise a first and second seam located at a first and second edge of the partially circular perimeter of the arm portions, the seams oriented generally parallel to a longitudinal axis of the tube when the rotating fastener is in the engagement position to provide an unbroken engagement surface between the tube and the arm portions.

5. The connecting assembly of claim 1, further comprising a safety marking on the connector, the rotating fastener being adapted to obscure the safety marking in the engagement position, the safety marking being visible in the disengagement position.

6. The connecting assembly of claim 5, wherein the safety marking comprises a reflective element.

7. The connecting assembly of claim 5, wherein the safety marking comprises a laser identifiable reflector.

8. The connecting assembly of claim 5, wherein the safety marking is located on the tube so that the safety marking is obscured by the handle member when the rotating fastener is in the engagement position.

9. The connecting assembly of claim 5, wherein the safety marking is located on the tube so that the safety marking is obscured by one or more arm portions when the rotating fastener is in the engagement position.

10. The connecting assembly of claim 5, wherein the safety marking is located on an inner surface of the handle member, the inner surface facing the tube when the rotating fastener is in the engagement position.

11. The connecting assembly of claim 1, wherein the handle member of the rotating fastener further comprises a leading edge generally perpendicular to a longitudinal centerline of the tube, the leading edge sloping towards the tube in the engagement position, a radial distance between the leading edge and the outer surface of the tube defining the access gap.

12. A connecting apparatus, comprising:
first and second longitudinally-extending, hollow tubes having first walls and first open ends, each of the first walls having a pair of openings;
a pair of fastener members, each comprising:
protuberances fitting in one of the pairs of openings in one of the first walls in an engagement position of the fastener members, the fastener members rotatable about the protuberances;
a pair of plate-like arm portions straddling the pair of openings and connected to the protuberances;
lifting means connected between the arm portions, the lifting means protruding above an outer surface of the tubes to form an access gap; and
disengagement means moving the protuberances outward from the openings when the fastener members are rotated about the protuberances to a disengagement position of the fastener members; and
an insert member having a second wall formed to slide longitudinally into the first open ends of the tubes, the insert member including means for moving the pair of connected protuberances of each of the fastener members and means for receiving the protuberances so that the protuberances can engage the tubes and the insert member.

13. The connecting apparatus of claim 12 wherein the moving means includes a tapered end on the insert member.

14. The connecting apparatus of claim 12 wherein each of the insert members includes first and second parts and holding means for holding the first and second parts together, the holding means including means for supporting an accessory extending transversely from the insert member.

15. The connecting apparatus of claim 14 wherein the holding means includes threaded openings in facing ends of the first and second parts and a threaded rod received in each of the openings.

16. The connecting apparatus of claim 15 wherein the accessory is a plate having openings for receiving the threaded rods in regions between the first and second parts.

17. The connecting apparatus of claim 12, wherein the access gap has a gap dimension defined as the radial distance between the lifting means and the outer surface of the tubes, the gap dimension measuring from 3 to 6 percent of an outer diameter of the tube.

18. The connecting apparatus of claim 12, wherein the access gap has a gap dimension defined as the radial distance between the lifting means and an outer surface of the tube, the gap dimension is generally sufficient to allow lifting access to initiate rotation of the fastener.

19. The connecting apparatus of claim 12, wherein each of the arm portions of the fastener members further comprise a first and second seam located proximate the protuberances, the seams oriented generally parallel to a longitudinal axis of the tubes to provide an unbroken engagement surface between the tubes and the arm portions.

20. The connecting apparatus of claim 12, further comprising a safety marking, the safety marking obscured by the fastener members in the engagement position, the safety marking visible when the fastener member is in the disengagement position.

21. The connecting apparatus of claim 20, wherein the safety marking comprises a reflective element.

22. The connecting assembly of claim 20, wherein the safety marking comprises a laser identifiable reflector.

23. The connecting assembly of claim 20, wherein the safety marking is located on at least one of the tubes so that the safety marking is obscured by one or more arm portions of the fastener members in the engagement position.

24. The connecting assembly of claim 20, wherein the safety marking is located on at least one of the tubes so that the safety marking is obscured by the lifting means of the fastener members in the engagement position.

25. The connecting assembly of claim 20, wherein the safety marking is located on an inner surface of the lifting means, the inner surface facing the tubes when the fastener members are in the engagement position.

26. The connecting apparatus of claim 12, wherein the lifting means of the fastener members comprise a leading edge generally perpendicular to a longitudinal centerline of the tube, the leading edge sloping towards the tube when the protuberances engage the tubes and the insert member, a radial distance between the leading edge and the outer surface of the tube defining the access gap.

* * * * *